2,795,053
SELF-MARKING PLUMB BOB

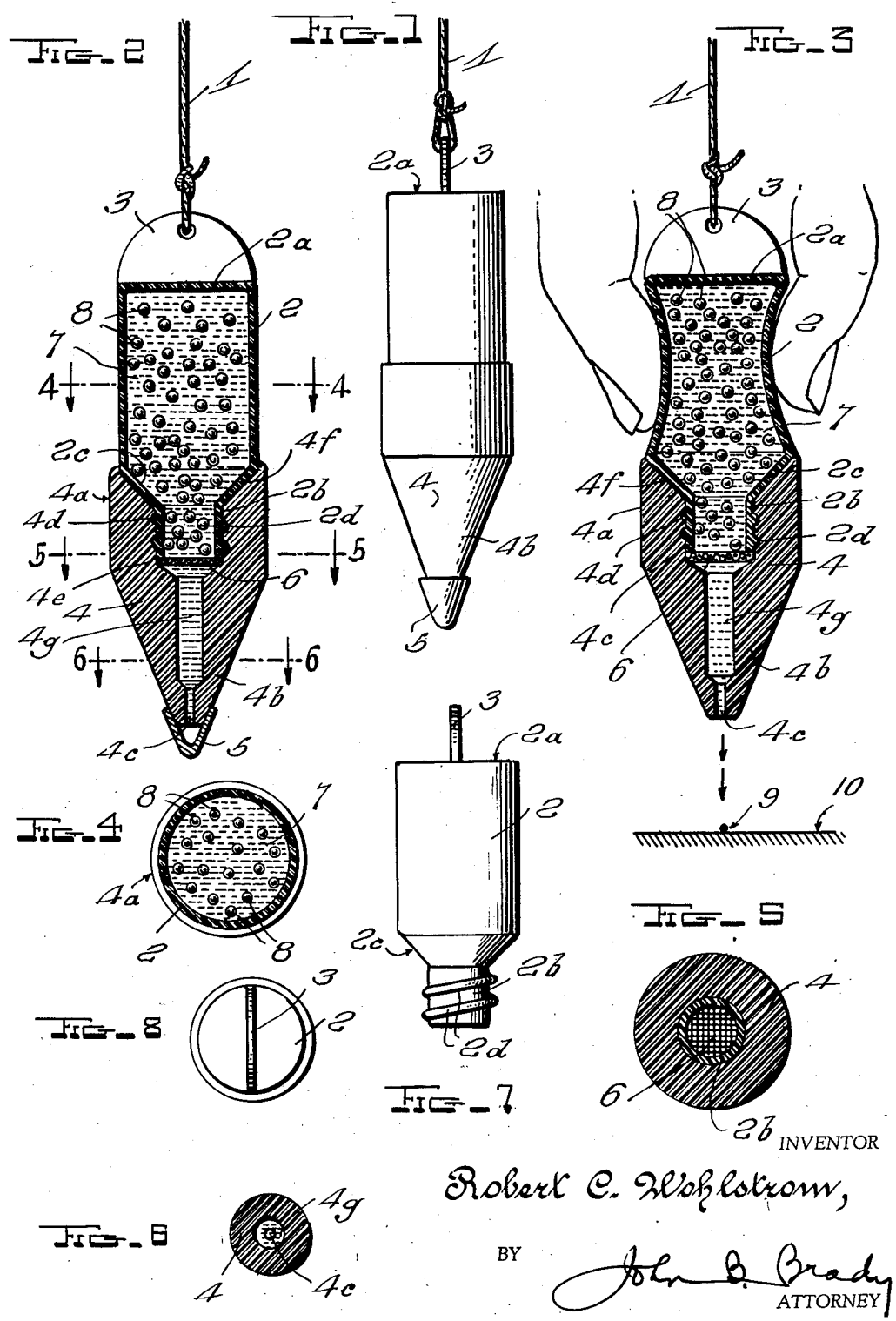

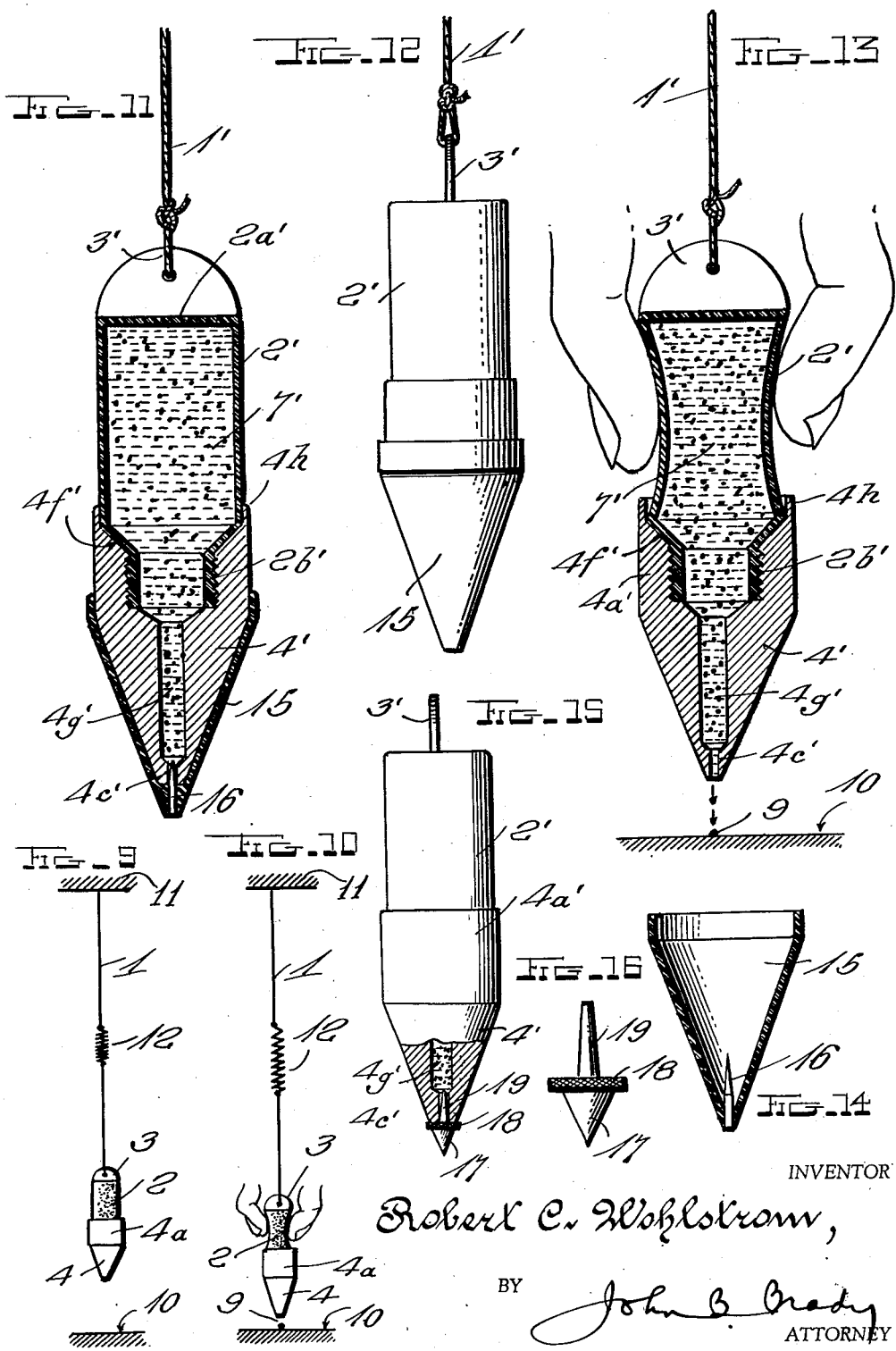

Robert C. Wohlstrom, East Hartford, Conn.

Application November 15, 1954, Serial No. 468,614

6 Claims. (Cl. 33—216)

My invention relates broadly to geometrical instruments and more particularly to an improved construction of plumb bob.

One of the objects of my invention is to provide an improved construction of plumb bob in which a marking of pasty consistency may be readily ejected from a gravitationally suspended weighted container for quickly and accurately marking a point directly beneath the plumb bob.

Another object of my invention is to provide a construction of plumb bob formed from polyethylene or resilient plastic constituting a container in a plumb bob which is squeezable for ejecting plastic material which is gravitationally dropped immediately below the plumb bob for marking a center for facilitating building operations.

Another object of my invention is to provide a construction of resilient collapsible container adapted to be suspended in inverted position while enclosing a weighted plastic mass insuring an accurate vertical suspension of the plumb bob in readiness for the ejection of the plastic mass drop-by-drop for marking a center directly beneath the plumb bob.

Still another object of my invention is to provide a construction of plumb bob having squeezable walls for ejecting a plastic mass contained therein drop-by-drop for marking a center as the terminus of the gravitationally suspended plumb bob contacts a plane horizontal surface or as the plastic material is squeezed from the container and drops gravitationally on the horizontal surface below.

Other and further objects of my invention reside in a construction of squeezable tube ejector self-marking plumb bob as set forth more fully in the specification hereinafter following by reference to the accompanying drawings, in which:

Fig. 1 is a side elevational view of the self-marking squeezable ejector type plumb bob of my invention, the view showing a closure cap in position on the terminus of the plumb bob prior to the placing of the bob into use;

Fig. 2 is a vertical sectional view through the self-marking plumb bob of my invention;

Fig. 3 illustrates the plumb bob of Figs. 1 and 2 in use and shows the manner of ejecting the plastic contents through the terminus of the plub bob;

Fig. 4 is a horizontal sectional view taken on line 4—4 of Fig. 2;

Fig. 5 is a horizontal sectional view taken on line 5—5 of Fig. 2, and illustrating particularly the screen which is provided for confining weighted members within the plastic mass in the squeezable container;

Fig. 6 is a horizontal sectional view taken on line 6—6 of Fig. 2;

Fig. 7 is an elevational view of the plastic container removed from the terminus;

Fig. 8 is a top plan view of the plumb bob of my invention;

Fig. 9 shows a modified application for the self-marking plumb bob of my invention where the plumb bob is gravitationally suspended through a spring capable of being expanded to a sufficient extent to allow the self-marking plumb bob to be moved into contact with the surface to be marked;

Fig. 10 illustrates the suspended coil spring expanded to enable the self-marking plumb bob to make marking contact with the surface to be marked;

Fig. 11 is a vertical sectional view through a further modified form of my invention in which the gravitating mass of the bob is concentrated into a metallic end into which the ejecting container is inserted;

Fig. 12 is a side elevational view of the bob of my invention shown in Fig. 11;

Fig. 13 shows the manner of operating the bob of my invention illustrated in Figs. 11 and 12;

Fig. 14 illustrates the closure cap for embracing the bob shown in Figs. 11–13;

Fig. 15 shows another form of closure for the bob when the device is not in use, the view showing a vertical cross section of the bob; and Fig. 16 is a side elevational view on an enlarged scale of the closure device shown in Fig. 15.

My invention is directed to a construction of resilient walled inverted container formed from polyethylene, or the like, and enclosing a chalk-like material of plastic consistency. The chalk-like material may be a white pigment dispersed in a fluid and mixed with a weighted mass such as a comminuted metal or BB shot. The weighted plastic mass is readily introduced through the neck of the container with the container maintained in upright position through conventional filling processes.

A terminus having a restricted ejector outlet is then affixed to the neck of the inverted container. The inverted container includes a fastening means on the rear thereof enabling the inverted container to be gravitationally suspended with the ejector terminus depending downwardly. A closure cap is normally applied over the end of the ejector terminus during shipment or non-use of the device. When the device is placed in use, the closure cap is removed, enabling the plastic contents of the container to be ejected drop-by-drop as pressure is applied to the resilient side walls of the container. As the container is gravitationally suspended in inverted position the plastic material will drop as a globule on the exact center of a horizontal surface below the plumb bob accurately marking the center for facilitating building operations. In certain applications of my invention the self-marking plumb bob is resiliently suspended and may be quickly pulled downwardly to the plane surface beneath to make quick contact therewith and the plastic material ejected to mark the center. In certain forms of my invention the lower portion of the bob is metallic and provides the mass for gravitationally centering the bob.

Referring to the drawings in more detail, reference character 1 designates a suspension cord fixed to a structural member for gravitationally suspending the plumb bob of my invention which consists of the cylindrical container 2 of resilient material, such as polyethylene, or other squeezable or deformable plastic or rubber. The container is provided with a flat vertically extending rib 3 which is substantially semi-circular in contour with the diametrical portion thereof integrally connected with the closed end wall 2a of the container. The container 2 is provided with a cylindrical neck 2b of reduced cross section as compared to the cross section of the resilient container 2. The cylindrical neck 2b is connected with resilient container 2 through the annular inclined wall 2c forming a seat for the terminus 4.

The terminus 4 is cylindrical throughout one portion of its length and has a diameter slightly larger than the diameter of container 2, as represented at 4a. The terminus tapers from the cylindrical portion 4a. An ejector tip, as represented at 4b, extends from the cylindrical portion 4a to the ejector orifice represented at 4c. The ejector orifice 4c is normally closed by a closure cap 5 which may either frictionally or screw-threadedly engage the outside of the tapered terminus 4b. The closure cap 5 is removed when the self-marking plumb bob is placed into use as represented in Figs. 3, 9 and 10. The inverted container 2 has screw-threads 2d formed on the exterior of the cylindrical neck 2b and these external screw-threads engage corresponding internal screw-threads 4d formed interiorly of the reduced section 4e of terminus 4. The reduced section 4e of terminus 4 is connected through an upwardly extending inclined wall 4f with the upper annular extremity of the terminus 4 and provides an annular seat against which the inclined annular wall 2c of container 2 is adapted to abut. The ejector orifice 4c of terminus 4 connects through a cylindrical bore 4g with the reduced section 4e of the terminus 4.

A filter screen 6 is mounted in the reduced section 4e immediately above the cylindrical bore 4g and is retained therein by the peripheral contact afforded by the cylindrical neck 2b of container 2, as container 2, in inverted position, is screwed into terminus 4. Thus it will be seen that the proportions of the depth of the reduced section 4e compared to the position of the inclined annular wall 4f must be such, as compared to the neck 2b and wall 2c of container 2, that when container 2 is screwed firmly into terminus 4 the peripheral edge of screw-threaded neck 2b will grip the periphery of circular filter screen 6 for firmly securing the filter screen 6 in position between the cylindrical bore 4g and the container 2 at the same time that wall 2c of container 2 establishes a firm abutment with the inclined wall 4f of terminus 4. Screen 6 is an important adjunct to my invention because the contents of container 2 include both the pasty material 7 and the BB shot 8 distributed therethrough. The BB shot 8 provides the mass necessary for the gravitational suspension of the plumb bob in a vertical position, while the pasty material 7 forms the marking material for making the gravitational marks beneath the plumb bob. The pasty material 7 has a semi-fluid-like consistency so that the material will flow through the filter screen 6 and through bore 4g and pass through the ejector orifice 4c.

In Fig. 3 I have shown how a drop 9 of the marking material has been ejected onto the horizontal surface 10 by both forced ejection and gravitation from container 2. I may also use the self-marking plub bob under the conditions illustrated in Figs. 9 and 10, where the suspension cord 1 is fastened to the upper structure 11 and contains a coil spring 12 intermediate the suspension 11 and the container 2. As represented in Fig. 9 the device may be suspended directly over the surface 10 to be marked and then as represented in Fig. 10 manually pressed downwardly, expanding the coil spring 12 and contacting the ejector orifice 4c against the surface 10, whereby a marking globule is discharged at the prescribed point on the surface 10. The quantity of the marking material discharged is readily controllable by compressing the outside walls of the resilient container 2 by the fingers as represented in Fig. 3.

Filter screen 6 prevents the BB shot 8 from passing into the cylindrical bore 4g and clogging the path to the ejector orifice 4c while permitting the marking material to readily pass therethrough.

A variety of marking materials may be provided in various colors according to the work which must be marked. Suitable pigments may be mixed with fluid to form a pasty consistency sufficient to insure the required fluid-flow. In lieu of the BB shot I may intermix comminuted metal with the paste as represented at 7' in container 2' as shown in Fig. 11 in which case the BB shot and the filter screen are omitted. In Figs. 11-14 I have shown modified forms of my invention where the parts corresponding to parts heretofore explained in connection with Figs. 1-10 are indicated by corresponding reference characters with a prime symbol added thereto. That is to say, the compressible container is represented at 2' terminating in a wide cylindrical neck 2b' with external screw-threads formed thereon approximateely $9/16 \times 14$ for engaging internal screw-threads formed on a metallic bob represented at 4'. The metallic terminus 4' takes the place of the plastic terminus 4 of Figs. 1-10 and provides the mass necessary for gravitationally stretching the suspension cord 1'. Cord 1' connects with rib 3' of container 2'. The metallic terminus 4' simulates the appearance of a conventional bob, although it is provided with internal passage 4g' and ejector orifice 4c' for the ejection of the comminuted marking paste 7' from container 2'. The weight of terminus 4' is for all practical purposes comparable to the mass of a conventional bob. The terminus 4' includes the interior upwardly inclined wall 4f' which terminates in a vertical peripheral portion or skirt 4h within which the container 2' is confined. No screen is necessary in the form of my invention shown in Figs. 11-16.

When the bob is not in use the ejector tip is covered and protected by the cap shown at 15 in Figs. 11, 12 and 14. The cap may be formed from plastic vinyl and have sufficient resiliency to fit over and fasten to the metallic terminus 4'.

The cap 15 may be provided with a pin 16 in the end thereof as represented more clearly in Figs. 11 and 14. The pin 16 projects upwardly into the cap 15 and is tapered to fit into the ejector orifice 4c' for sealing the terminus 4' against leakage of the plastic 7'.

As an alternative method of sealing the ejector orifice 4c', I may employ the terminus shown in Figs. 15 and 16, at 17. The terminus 17 comprises a conical point which is integral with the knurled flange 18 from which the tapered plug 19 extends. The tapered plug 19 may be inserted frictionally into the ejector orifice 4c' for closing the orifice against leakage of the plastic material 7'. The terminus 17 is steel and is formed in a sharp point so that the plumb bob with which it is associated resembles closely the conventional plumb bob and may be used both conventionally and in conjunction with the marking material when it is desired to mark a predetermined point. When the marking material is used to mark a center the plug 19 is removed and the container 2' subjected to a normal squeezing operation while the plumb bob is gravitationally suspended on cord 1' so that a drop of the marking material, represented at 9, may be gravitationally dropped on the surface 10 to mark the exact center. The steel terminus 17 is either hardened steel or is case hardened, especially at the sharp point so that normal rough usage will not injure the point.

I have found the self-marking plumb bob of my invention highly practical and successful in operation and while I have described my invention in certain of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A plumb bob comprising a resilient cylindrical container having a closed end wall at the top and an open cylindrical neck at the bottom thereof adapted to be suspended with the neck depending downwardly, and a terminus member screw-threaded over said neck, said terminus member having an orifice in the end thereof, said resilient cylindrical container enclosing a pasty mass of marking material adapted to be ejected while said container is gravitationally suspended for ejection through said orifice for marking a surface beneath, said marking material in said container being intermixed with BB shot constituting the mass for gravitating said plumb bob in a suspended marking position.

2. A plumb bob comprising a resilient cylindrical container having a closed end wall at the top and an open cylindrical neck at the bottom thereof adapted to be suspended with the neck depending downwardly, and a terminus member screw-threaded over said neck, said terminus member having an orifice in the end thereof, said resilient cylindrical container enclosing a pasty mass of marking material adapted to be ejected while said container is gravitationally suspended for ejection through said orifice for marking a surface beneath, said marking material in said container being intermixed with BB shot constituting the mass for gravitating said plumb bob in a suspended marking position, and a filter screen interposed between said container and said orifice for permitting the passage of said marking material while retaining said BB shot within said container.

3. A plumb bob comprising a resilient cylindrical container having a closed end wall at the top and an open cylindrical neck at the bottom thereof adapted to be suspended with the neck depending downwardly, and a terminus member screw-threaded over said neck, said terminus member having an orifice in the end thereof, said resilient cylindrical container enclosing a pasty mass of marking material adapted to be ejected while said container is gravitationally suspended for ejection through said orifice for marking a surface beneath, said terminus member being formed from metal and wherein a metallic member having a marking point on the lower end thereof and a sealing plug on the other end thereof is provided, and wherein said sealing plug is insertable into and removable from the orifice in said terminus member.

4. A plumb bob comprising a resilient cylindrical container having a closed end wall at the top and an open cylindrical neck at the bottom thereof adapted to be suspended with the neck depending downwardly, and a terminus member screw-threaded over said neck, said terminus member having an orifice in the end thereof, said resilient cylindrical container enclosing a pasty mass of marking material adapted to be ejected while said container is gravitationally suspended for ejection through said orifice for marking a surface beneath, and a marking member attachable to said terminus member, said marking member including a centrally disposed horizontally extending knurled flange with a marking point depending downwardly therefrom, and a sealing plug projecting vertically therefrom, said sealing plug being insertable into said orifice in said terminus member.

5. In a plumb bob comprising a resilient cylindrical container having a closed end wall at the top and an open cylindrical neck at the bottom thereof adapted to be suspended with the neck depending downwardly, and a terminus member screw-threaded over said neck, said terminus member having an orifice in the end thereof, said resilient cylindrical container enclosing a pasty mass of marking material adapted to be ejected while said container is gravitationally suspended for ejection through said orifice for marking a surface beneath, said terminus member being tapered and a frusto-conical closure cap insertable over and removable from said terminus member, said cap including a central plug in the end thereof projecting upwardly and being tapered for engaging the orifice in said terminus member for preventing leakage of the marking material from said container.

6. A plumb bob comprising a resilient cylindrical container having a closed end wall at the top and an open cylindrical neck at the bottom thereof adapted to be suspended with the neck depending downwardly, and a terminus member screw-threaded over said neck, said terminus member having an orifice in the end thereof, said resilient cylindrical container enclosing a pasty mass of marking material adapted to be ejected while said container is gravitationally suspended for ejection through said orifice for marking a surface beneath, in which the pasty mass of marking material within said container comprises a mixture of comminuted metal and marking material, the comminuted metal being distributed through the marking material and comprising a gravitational mass for maintaining said plumb bob over a gravitational center while suspended.

References Cited in the file of this patent

UNITED STATES PATENTS

| 579,135 | Cooper | Mar. 23, 1897 |
| 2,207,294 | Hubner et al. | July 9, 1940 |
| 2,729,505 | Harvey | Jan. 3, 1956 |

FOREIGN PATENTS

| 1,020,142 | France | Nov. 12, 1952 |
| 1,044,937 | France | June 24, 1953 |